United States Patent [19]

Johansson

[11] Patent Number: 4,500,249
[45] Date of Patent: Feb. 19, 1985

[54] SELF-ADJUSTING BOAT TRAILER CRADLE

[76] Inventor: Lars Johansson, Kalmarsand, S-198 00 Bålsta, Sweden

[21] Appl. No.: 348,763

[22] Filed: Feb. 16, 1982

[30] Foreign Application Priority Data

Feb. 18, 1981 [SE] Sweden .............................. 8101102

[51] Int. Cl.³ .............................................. B60P 3/10
[52] U.S. Cl. ..................................... 414/534; 414/529
[58] Field of Search ............. 414/494, 529, 532, 533, 414/534, 539, 559; 193/35 C, 35 SS; 280/414.1

[56] References Cited

U.S. PATENT DOCUMENTS

| | | | |
|---|---|---|---|
| 2,708,045 | 5/1955 | Shontz | 414/494 X |
| 3,026,981 | 3/1962 | Youtie | 414/534 X |
| 3,077,277 | 2/1963 | Holzman | 414/534 |
| 3,117,683 | 1/1964 | Kleppe | 414/534 |
| 3,447,815 | 6/1969 | West | 280/414.1 X |
| 3,892,320 | 7/1975 | Moore | 414/534 |
| 3,993,324 | 11/1976 | Carrick | 280/414.1 |
| 4,209,279 | 6/1980 | Aasen | 414/534 |

FOREIGN PATENT DOCUMENTS 1508392 11/1967 France .............................. 414/534

Primary Examiner—Leslie J. Paperner
Assistant Examiner—Ken Muncy
Attorney, Agent, or Firm—Burton, Parker & Schramm

[57] ABSTRACT

A boat trailer cradle comprising a stationary supporting framework adapted to be mounted to the frame side members of a boat trailer chassis, a two-shafted cradle vertically adjustable with respect to the supporting framework and carrying four rubber-tired wheels and two keel rollers, and two rubber-wheeled lateral supporting arms pivotally connected between the cradle and the supporting framework in a manner such that upon depression of the cradle through the load of a boat hauled up onto it, the arms are swung upwards with their rubber-tired wheels laterally supporting the boat.

2 Claims, 4 Drawing Figures

SELF-ADJUSTING BOAT TRAILER CRADLE

BACKGROUND OF THE INVENTION

The invention relates to a self-adjusting boat trailer cradle for launching, hoisting and transportation of small boats.

In recent years boat trailers have been developed by means of which motor-boats and sailboats may be loaded and transported from the site to the launching site. Frequently, a small-boat trailer is built as a small slipway which may be wheeled downward into the water with the boat loaded thereon until the boat is launched and its lashings may be removed. One type of boat trailer comprises a two- or four-wheeled cart or carriage having a rectangular chassis frame and a pair of longitudinally extending girders upon which keel rollers are mounted. In the vicinity of the two rear corners of the chassis frame, or all the four corners of a carriage, vertically adjustable stanchions are provided by means of which the boat can be shored subsequently to its hauling up onto the trailer with the keel rolling on the keel rollers. At the ends of the stanchions plates are pivotally mounted so that they may adapt themselves to the shape of the hull.

A boat trailer of the described type and other similar types suffers from the disadvantage that it demands a time-consuming readjustment of the hull stanchions each time when a boat will be loaded and unloaded. A further disadvantage resides in the fact that in the course of its loading or unloading, the boat could be damaged by the hull stanchions and, in turn, these could be damaged by the boat. Admittedly, the construction has been improved by replacing the plates of the hull stanchions with rubber-tired wheels so that the boat will not be damaged. Despite the soft reception afforded by the rubber-tired wheels it has turned out, however, that the hull stanchions may be deformed, or that the rubber tires may be pulled off their rims through unskilled or careless handling.

On account of the shortcomings reported above a main object of the present invention is to provide an automatically adjustable boat trailer cradle which does not need any readjustments as soon as a boat is to be transported, and which cannot damage the boat and cannot itself be damaged by the boat.

SUMMARY OF INVENTION

According to the invention there is provided a boat trailer cradle comprising:
(a) two parallel girders adapted bo be mounted on two parallel longitudinal frame side members of a boat trailer chassis;
(b) a cradle frame positioned between said girders, said cradle frame including:
  (i) two parallel side members connected with one another over cross members in a manner such that their ends extend outside the cross members;
  (ii) two wheel shafts mounted between the free end of the side members with the ends of the shafts extending into the spaces between the girders and said parallel side members and each of said shaft ends carrying a freely rotatable rubber-tired wheel for steering a boat in the course of its hauling up on to the cradle;
  (iii) a pair of keel rollers each of which being mounted freely rotatable on its respective shaft between the side members of the cradle frame; and
(c) a pair of cradle suspension mechanisms mounted between the frame side members and girders symmetrically with respect to the longitudinal and transversal axes of the cradle frame, each of said suspension mechanisms comprising a supporting arm extending outwards in the transverse axial direction of the cradle frame, said supporting arm: (i) being pivotally connected at its inner end, on one hand, via an innermost pivot pin, with the frame side member and, on the other hand, via an intermediate pivot pin, with the adjacent girder; and
  (ii) carrying at its extreme end a rubber-tired wheel; the pivots mounted to said girders constituting fulcrums of said arms thus acting as a pair of double-armed levers, wherein the length of the levers connected with the pivots mounted to said frame side members is governed by the distance between the pivots of the side members of the cradle frame and the respective adjacent girder, whereas each of the extreme levers with its rubber-tired wheel is of a length such that the static moments of the respective extreme levers with the rubber-tired wheel and the inner levers with the cradle coupled thereto are substantially equal, with the lateral support arms swung outwards horizontally and with the cradle unloaded.

Figure 1:
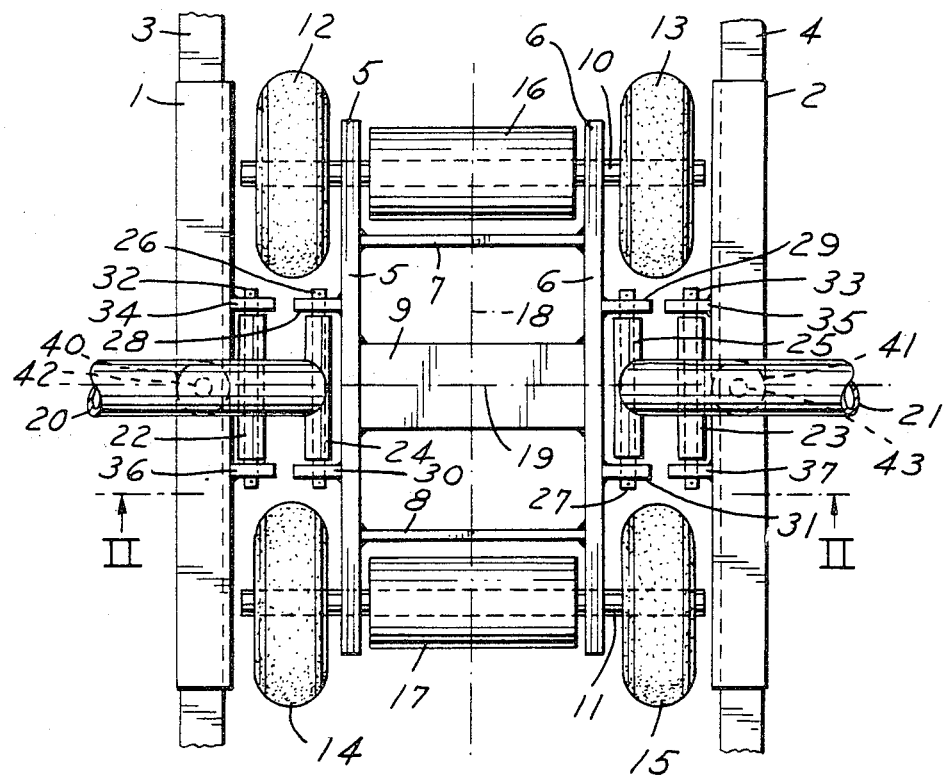
FIG. 1 is a top plan view of a self-adjusting boat trailer cradle according to the invention.

In the drawing a stationary supporting framework is shown, which comprises two parallel girders 1, 2 mounted on the chassis members 3, 4 of a boat trailer chassis. In the space between the girders 1, 2 a vertically adjustable cradle frame is shown, the coupling of which to the girders will be described in more detail hereinafter.

The vertically adjustable cradle frame comprises two longitudinally extending frame side members 5, 6 which are connected with one another over two outer cross members 7, 8 and an intermediate cross member 9. The ends of the frame side members 5, 6 extend outside the outer cross members 7, 8. Mounted between the free ends of said frame side members are two wheel shafts 10, 11, the ends of which are located in the spaces between the girders 1, 2 and side members 5, 6. Rotatably mounted on the shafts 10, 11 are two pairs of rubber-tired wheels 12, 13 and 14, 15, respectively, for steering a boat in the course of its hauling up on to the cradle and subsequently supporting the boat from below.

Between the girders 1, 2 of the cradle, each of the wheel shafts 10, 11 carries a keel roller 16 and 17, respectively, which is freely rotatable with respect to the shaft. The keel rollers are preferably provided with a wear resistant rubber cover.

Mounted between the stationary girders 1, 2 and the frame side members 5, 6 of the cradle frame, symmetrically with respect to its longitudinal axis 18 and transverse axis 19, are two cradle suspension mechanisms.

Each one of said suspension mechanisms comprises a supporting arm 20, 21 in the shape of a tube which is provided at its inner end with a first tubular sleeve 22, 23 welded thereto at right angles to the axis of the tube. At a distance from this sleeve which constitutes only a fraction of the total length of the tube 20, 21, a second tubular sleeve 24, 25 is welded to the tube in offset parallel relation to the first tubular sleeve. The second tubular sleeve 24, 25 of the supporting arm 20, 21 is journalled on a pivot pin 26, 27 which, in turn, is journalled in two brackets 28, 29 and 30, 31, respectively, welded in relation to the transverse axis of the cradle frame.

In a similar way, the first tubular sleeve 22, 23 of the supporting arm 20, 21 is journalled on a pivot pin 32, 33 which in turn is journalled in two brackets 34, 35 and 36, 37, respectively, said brackets being welded to the inside of the stationary girder 1, 2 in front of the brackets first mentioned. Each supporting arm 20, 21 carries at its extreme end a rubber-tired wheel 38, 39 acting as a lateral support for the boat.

The supporting arm 20, 21 of the boat cradle acts as a double-armed lever with the pivot pin 32, 33 at the stationary girders 1, 2 as the fulcrum. The portion of the supporting arm 20, 21 located between the pivot pins 26 and 32, and between pivot pins 27 and 33, respectively, constitutes the shorter lever $2_1$ (FIG. 2), and the portion outside the pivot pin 32, 33 constitutes the longer lever $1_1$. The length of the shorter lever is governed by the distance between the pivots 22, 24 and 23, 25 of the girder 1, 2 and frame side member 5, 6, respectively. The length of the external lever $1_1$ carrying the rubber-tired wheel 38, 39 is governed to satisfy the criterion that the static moments of the external lever $1_1$ with the rubber-tired wheel 38, 39 and the inner levers $1_2$ with the cradle coupled thereto are substantially equal, with the lateral support arms 20, 21 swung outwards horizontally and with the cradle unloaded.

For several reasons, however, it is not desirable or even allowable to have the support arms 20, 21 swung out horizontally or even below the horizontal plane through the wheel shafts 10, 11, which could be the case if the support arms were long enough. Partly the boat cradle would be lifted so high that the haulage of a boat onto the cradle would be obstructed, partly there would be a risk that a person standing on the beach could be injured or knocked down when the trailer loaded with the boat is launched and, partly, the horizontally swung out support arms would be a traffic hazard when driving the trailer on a road. Moreover, the loosely swung out arms would give rise to a troublesome noise. For that reason, according to the invention, support rollers or cushions 40, 41 made from soft rubber are mounted on upstanding steel dowels 42, 43 on the side members 1, 2 of the boat trailer cradle.

Figure 2:
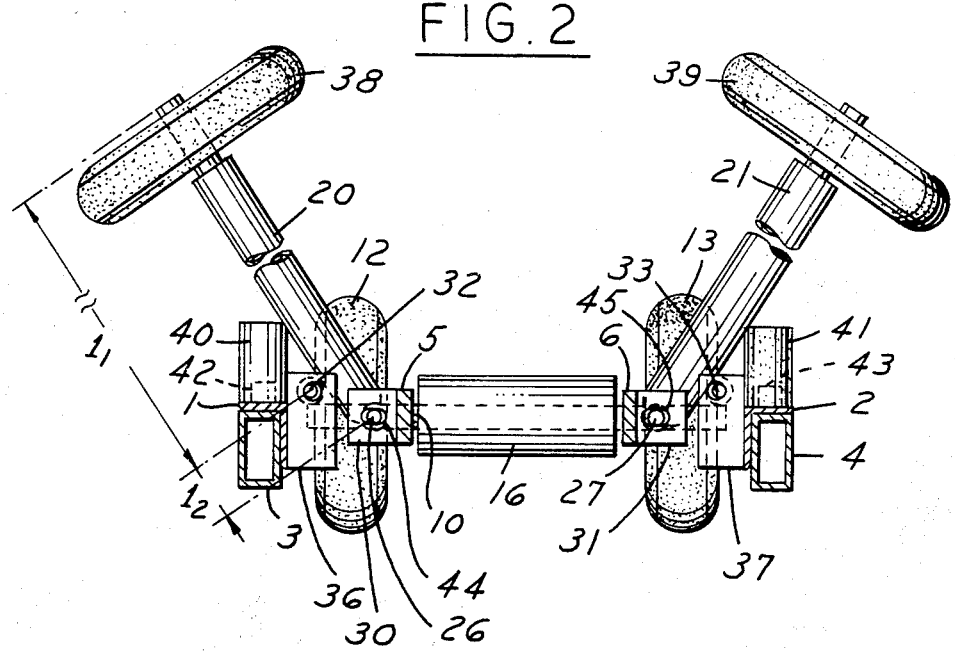
FIG. 2 is a vertical sectional view taken through the device along lines II—II in FIG. 1.
Figure 3:
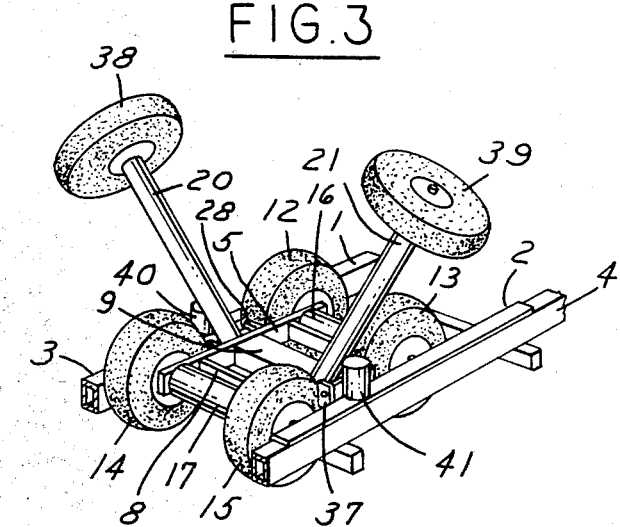
FIG. 3 is a perspective view of the device.
Figure 4:
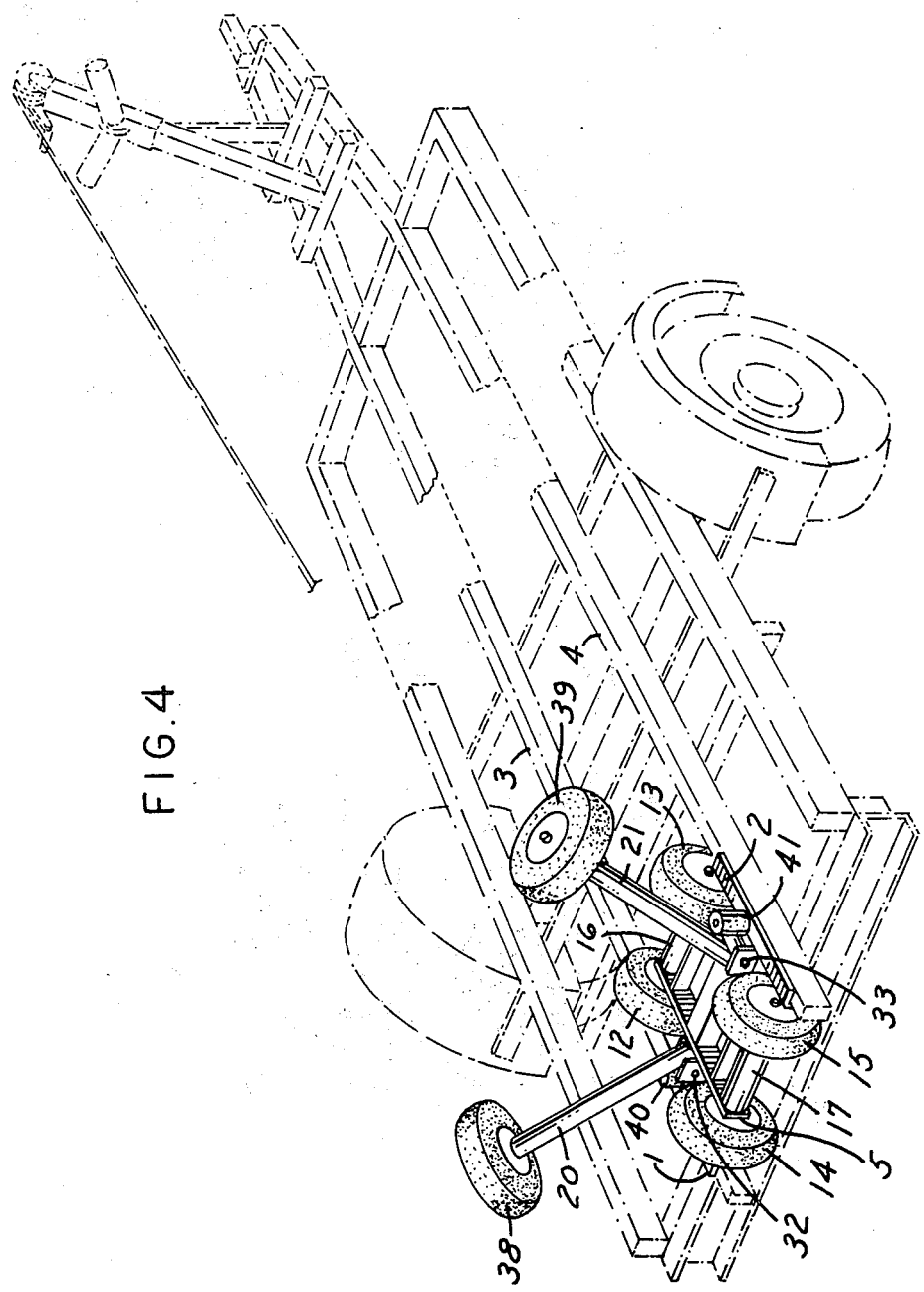
FIG. 4 is a perspective view showing the self adjusting boat trailer cradle mounted on a boat trailer chassis shown in phantom outline.

It should be noted that the distance between the tubular sleeves 24, 25 of the supporting arms 20, 21 increases and decreases when the supporting arms are swung inwards and outwards. For that reason, the holes in the brackets 28, 29 and 30, 31 of the frame side members 5, 6 are made as long holes 44, 45 as shown in FIG. 2.

Furthermore, it should be noted that the four wheels 12–15 of the cradle exclusively have to their purpose to steer a boat in the course of its hauling up onto the cradle end, if necessary, to support the boat from below in the case its bottom is so flat that it reaches the wheels which, however, especially is not true in the case of a deep-keeled sailboat. In this case the boat resting with the keel on the keel rollers 16, 17 is laterally supported only by the wheeled lateral supporting arms.

The choice of materials and dimensioning for the boat trailer cradle according to the invention is a matter of judgement with respect to the size and type of boat. By way of example, longer supporting arms are required for a sailboat than for a flat-bottomed powerboat. However, a certain degree of flexibility can be achieved by means of exchangeable support arms or telescoping support arms.

One boat cradle will suffice for the transport of a boat having a length of up to 4–6 m dependent on the size of the boat cradle. For larger boats and yachts two or more cradles mounted in tandem on a common trailer chassis would be necessary.

What is claimed is:

1. A self contained boat trailer cradle adapted to be mounted on a boat trailer chassis having a pair of parallel longitudinal chassis members, said boat trailer cradle comprising:
   (a) two parallel girders (1,2) adapted to support said cradle on the pair of parallel longitudinal chassis members (3,4) of a boat trailer chassis;
   (b) a cradle frame positioned and extending between and supported on said two parallel girders, said cradle frame including:
      (i) two parallel frame side members connected with one another over cross members in a manner such that their ends extend outside the cross members;
      (ii) two wheel shafts mounted between the free ends of said frame side members of the cradle frame with the ends of the shafts extending into the spaces between the girders and said parallel frame side members and each of said shaft ends carrying a freely rotatable rubber-tired wheel for steering a boat in the course of its hauling up on to the cradle;
      (iii) a pair of keel rollers each of which being mounted freely rotatable on its respective shaft between the frame side members of the cradle frame; and
   (c) a pair of cradle suspension mechanisms mounted between the frame side members and the girders symmetrically with respect to the longitudinal and transverse axes of the cradle frame, each of said suspension mechanisms comprising a supporting arm extending outwards in the transverse axial direction of the cradle frame, said supporting arm:
      (i) being pivotally connected at its inner end, on one hand, via an innermost pivot pin, with the frame side member of the cradle and, on the other hand, via an intermediate pivot pin, with the adjacent girder; and
      (ii) carrying at its extreme end a rubber-tired wheel; the pivots mounted to said girders constituting fulcrums of said arms thus acting as a pair of double-armed levers, wherein the length of the levers connected with the pivots mounted to said frame side members is governed by the distance between the pivots of the side members of the cradle frame and the respective adjacent girder, whereas each of the extreme levers with its rubber-tired wheel is of a length such that the static moments of the respective extreme levers with the rubber-tired wheel and the inner levers with the cradle coupled thereto are substantially equal, when the lateral support arms are swung outwards horizontally and with the cradle unloaded.

2. The boat trailer cradle of claim 1 wherein cushions made of resilient material are mounted on the top of the stationary girders of the cradle in the swinging plane of the supporting arms in order to keep them in an elevated position.

* * * * *